(12) United States Patent
    Kamei et al.

(10) Patent No.: US 9,213,891 B2
(45) Date of Patent: Dec. 15, 2015

(54) INFORMATION PROCESSING DEVICE

(75) Inventors: Shinichiro Kamei, Tokyo (JP);
  Nobuhisa Shiraishi, Tokyo (JP);
  Takeshi Arikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 116 days.

(21) Appl. No.: 14/000,159

(22) PCT Filed: Jan. 19, 2012

(86) PCT No.: PCT/JP2012/000291
  § 371 (c)(1),
  (2), (4) Date: Oct. 10, 2013

(87) PCT Pub. No.: WO2012/111252
  PCT Pub. Date: Aug. 23, 2012

(65) Prior Publication Data
  US 2014/0037150 A1    Feb. 6, 2014

(30) Foreign Application Priority Data

Feb. 17, 2011    (JP) .................................. 2011-031613

(51) Int. Cl.
  *G06K 9/00*    (2006.01)
  *G06K 9/62*    (2006.01)
(52) U.S. Cl.
  CPC ........ *G06K 9/00369* (2013.01); *G06K 9/00771* (2013.01); *G06K 9/6292* (2013.01)
(58) Field of Classification Search
  CPC ........... G07C 9/00158; G07C 9/00087; G06K 9/00885; G06K 2009/00932; G06F 21/32; G01S 13/931; G08G 1/16; B60T 7/22
  USPC .......................... 382/115; 701/301, 207, 736
  See application file for complete search history.

(56) References Cited

U.S. PATENT DOCUMENTS

| | | |
|---|---|---|
| 5,377,309 A | 12/1994 | Sonobe et al. |
| 2005/0125154 A1 | 6/2005 | Kawasaki |

(Continued)

FOREIGN PATENT DOCUMENTS

| | | |
|---|---|---|
| CN | 1811774 A | 8/2006 |
| JP | 2004-283959 A | 10/2004 |

(Continued)

OTHER PUBLICATIONS

Miyashita et al, an English machine translation of JP2011-9791, Jan. 13, 2011.*

(Continued)

*Primary Examiner* — Ruiping Li
(74) *Attorney, Agent, or Firm* — Sughrue Mion, PLLC

(57) ABSTRACT

An information processing device 200 of the present invention includes: a recognition result acquiring means 201 for acquiring respective recognition result information outputted by a plurality of recognition engines 211, 212 and 213 executing different recognition processes on recognition target data; and an integration recognition result outputting means 202 for outputting a new recognition result obtained by integrating the respective recognition result information acquired from the plurality of recognition engines. The recognition result acquiring means 201 is configured to acquire the respective recognition result information in a data format common to the plurality of recognition engines, from the plurality of recognition engines. The integration recognition result outputting means 202 is configured to integrate the respective recognition result information based on the respective recognition result information, and output as the new recognition result.

10 Claims, 14 Drawing Sheets

(56) References Cited

U.S. PATENT DOCUMENTS

| | | | |
|---|---|---|---|
| 2009/0226093 A1 | 9/2009 | Guo et al. | |
| 2010/0231711 A1 | 9/2010 | Taneno et al. | |
| 2012/0197439 A1* | 8/2012 | Wang et al. | 700/259 |

FOREIGN PATENT DOCUMENTS

| | | |
|---|---|---|
| JP | 2005-165421 A | 6/2005 |
| JP | 2009-211275 A | 9/2009 |
| JP | 2011-008791 A | 1/2011 |
| RU | 2315352 C2 | 1/2008 |

OTHER PUBLICATIONS

International Search Report for PCT/JP2012/000291, dated Apr. 17, 2012.
Communication dated Feb. 20, 2015, issued by the Russian Patent Office in counterpart Application No. 2013138366/08.
Communication dated Mar. 12, 2015, issued by the Russian Patent Office in counterpart Application No. 2013138366/08.
Communication dated May 26, 2015, issued by the Russian Patent Office in counterpart Application No. 2013138366/08.
Communication dated Apr. 20, 2015 from the State Intellectual Property Office of People's Republic of China in counterpart Application No. 201280009259.1.

* cited by examiner

INFORMATION PROCESSING DEVICE

CROSS REFERENCE TO RELATED APPLICATIONS

This application is a National Stage of International Application No. PCT/JP2012/000291 filed Jan. 19, 2012, claiming priority based on Japanese Patent Application No. 2011-031613 filed Feb. 17, 2011, the contents of all of which are incorporated herein by reference in their entirety.

TECHNICAL FIELD

The present invention relates to an information processing device, more specifically, relates to an information processing device that further outputs a result through the use of the results of recognition by a plurality of recognition engines.

BACKGROUND ART

In accordance with development of information processing techniques, various recognition engines executing recognition processes have been developed. For example, there exist various recognition engines, such as a recognition engine that identifies a person from still image data, a recognition engine that generates location information tracing the flow of a person from moving image data, and a recognition engine that generates text data from speech data. As one example, Patent Document 1 discloses a robot that is equipped with recognizers for image recognition and speech recognition.
Patent Document 1: Japanese Unexamined Patent Application Publication No. 2004-283959

Although various recognition engines have been developed as described above, the respective recognition engines are incorporated in specific systems depending on individual applications, and therefore, it is difficult to use these recognition engines for other purposes. Even if it is intended to reuse the recognition engines, development of a new system capable of using the recognition engines needs huge cost because output formats of the recognition engines are different from each other. Thus, there is a problem that it is impossible to flexibly respond to an application's request for use of output results acquired from a plurality of recognition engines and development of such a system needs huge cost.

SUMMARY

Accordingly, an object of the present invention is to solve the abovementioned problem; it is difficult to reuse output results acquired from a plurality of recognition engines at low cost.

In order to achieve the abovementioned object, an information processing device of an exemplary embodiment of the present invention includes:

a recognition result acquiring means for acquiring respective recognition result information outputted by a plurality of recognition engines executing different recognition processes on recognition target data; and an integration recognition result outputting means for outputting a new recognition result obtained by integrating the respective recognition result information acquired from the plurality of recognition engines, wherein:

the recognition result acquiring means is configured to acquire the respective recognition result information in a data format common to the plurality of recognition engines, from the plurality of recognition engines; and the integration recognition result outputting means is configured to integrate the respective recognition result information based on the respective recognition result information and output as the new recognition result.

Further, a computer program of another exemplary embodiment of the present invention is a computer program including instructions for causing an information processing device to realize:

a recognition result acquiring means for acquiring respective recognition result information outputted by a plurality of recognition engines executing different recognition processes on recognition target data; and an integration recognition result outputting means for outputting a new recognition result obtained by integrating the respective recognition result information acquired from the plurality of recognition engines, the computer program also including instructions for:

causing the recognition result acquiring means to acquire the recognition result information in a data format common to the plurality of recognition engines, from each of the plurality of recognition engines; and causing the integration recognition result outputting means to integrate the respective recognition result information based on the respective recognition result information and output as the new recognition result.

Further, an information processing method of another exemplary embodiment of the present invention includes:

acquiring respective recognition result information outputted by a plurality of recognition engines executing different recognition processes on recognition target data, the respective recognition result information being in a data format common to the plurality of recognition engines; and integrating the respective recognition result information based on the respective recognition result information acquired from the plurality of recognition engines and outputting as a new recognition result.

With the configurations as described above, the present invention can provide an information processing device capable of reusing outputs results acquired from a plurality of recognition engines at low cost.

EXEMPLARY EMBODIMENTS

First Exemplary Embodiment

A first exemplary embodiment of the present invention will be described with reference to FIGS. 1 to 9. FIGS. 1 to 4 are diagrams for describing the configuration of an intermediate-layer device in this exemplary embodiment, and FIGS. 5 to 9 are diagrams for describing the operation thereof.

[Configuration]

Figure 1:
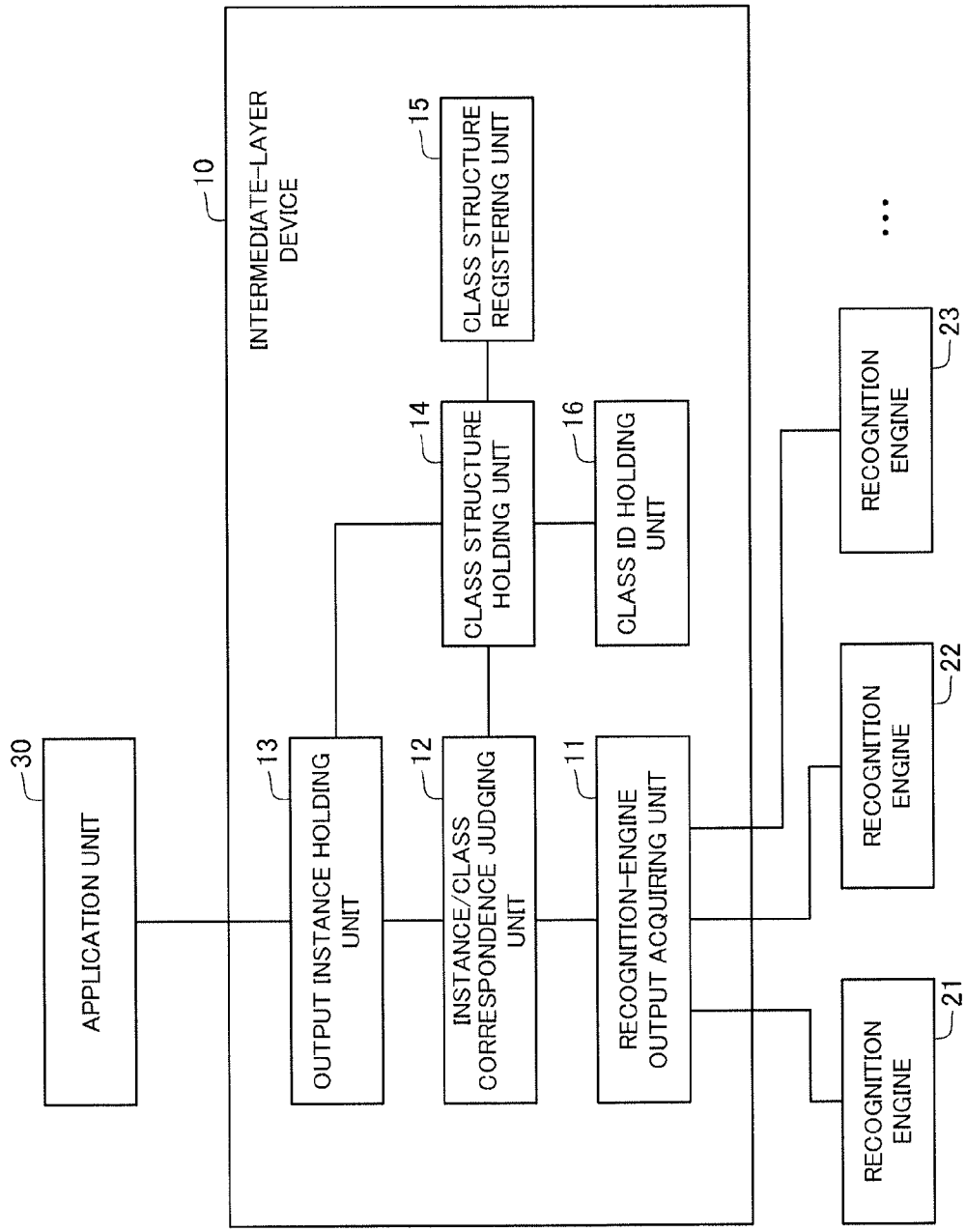
FIG. 1 is a block diagram showing the configuration of an intermediate-layer device in the present invention.

As shown in FIG. 1, an information processing system in the first exemplary embodiment includes a plurality of recognition engines 21 to 23, an intermediate-layer device 10 connected with the recognition engines 21 to 23, and an application unit 30 implemented in an information processing terminal connected with the intermediate-layer device 10.

The recognition engines 21 to 23 are information processing devices that execute different recognition processes, respectively, on recognition target data. The recognition engines 21 to 23 are, for example: a recognition engine that identifies a person from recognition target data like still image data, moving image data and speech data; a recognition engine that generates location information tracing the flow of a person from moving image data; and a recognition engine that generates text data from speech data of recognition target data. The recognition engines in this exemplary embodiment are a person recognition engine (denoted by reference numeral 21 hereinafter) that identifies a previously set person from among moving image data, and a flow recognition engine (denoted by reference numeral 22 hereinafter) that recognizes a flow representing the trajectory of an object from among moving image data. The recognition engines are not limited to those executing the recognition processes described above, and the number thereof is not limited to two as described above or three as shown in FIG. 1. For example, the abovementioned person recognition engine may be an object recognition engine that identifies not only a person but a previously set object.

To be specific, the person recognition engine 21 detects previously registered feature value data of a "specific person" that the person recognition engine 21 is requested to execute a recognition process, from among frame images at respective dates and times of moving image data. Upon detecting the feature value data, the person recognition engine 21 recognizes that the "specific person" has been in a set-up position of a camera having acquired the moving image data at the detection data and time, and outputs person identification information (a person ID) set for the recognized "specific person" and location information showing the date/time and position that the data has been detected, as recognition result information. The person recognition engine 21 in this exemplary embodiment outputs the recognition result information described above to the intermediate-layer device 10 in accordance with a data format that is previously registered in the intermediate-layer device 10 as described later, and the data format will be described later.

Further, to be specific, the flow recognition engine 22 detects a moving object in moving image data, and recognizes a time-series trajectory of the object. Then, the flow recognition engine 22 outputs object identification information (an object ID) identifying the moving object, trajectory identification information (a trajectory ID) identifying the detected whole trajectory, and flow information including dates/times and positions (coordinates) that the object has been detected, as recognition result information. The flow recognition engine 22 in this exemplary embodiment outputs the recognition result information described above to the intermediate-layer device 10 in accordance with a data format that is previously registered in the intermediate-layer device 10 as described later, and the data format will be described later.

Next, the application unit 30 will be described. The application unit 30 is implemented in an information processing terminal connected to the intermediate-layer device 10, and has a function of making a request to the intermediate-layer device 10 for the results of recognition by the recognition engines 21 to 23. In this exemplary embodiment, the application unit 30 specifically requests for a new recognition result obtained by reusing and integrating the result of recognition by the object recognition engine 21 and the result of recognition by the flow recognition engine 22. To be specific, in an example described in this exemplary embodiment, the application 30 makes a request to the intermediate-layer device 10 for the "flow of a specific person."

Next, the intermediate-layer device 10 will be described. The intermediate-layer device 10 is an information processing device including an arithmetic device and a storage device. The intermediate-layer device 10 includes a recognition-engine output acquiring unit 11, an instance/class correspondence judging unit 12, an output instance holding unit 13, and a class structure registering unit 15, which are built by incorporation of programs into the arithmetic device, as shown in FIG. 1. The intermediate-layer device 10 also includes a class structure holding unit 14 and a class ID holding unit 16 in the storage device. The respective configurations will be described in detail below.

First, the recognition-engine output acquiring unit 11 (a recognition result acquiring means) acquires recognition result information generated in recognition processes by the person recognition engine 21 and the flow recognition engine 22 from the respective engines as described above. Then, the instance/class correspondence judging unit 12 (the recognition result acquiring means) holds each of the acquired recognition result information in a previously defined class structure showing a data format.

Figure 2:
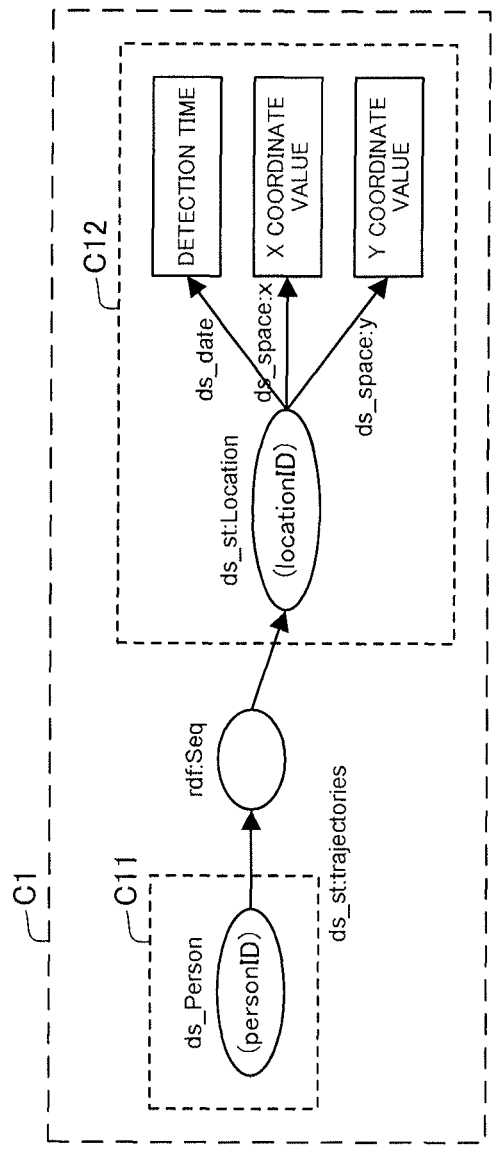
FIG. 2 is a diagram showing an example of the structure of a recognition result registered in an intermediate-layer device in a first exemplary embodiment of the present invention.
Figure 6:
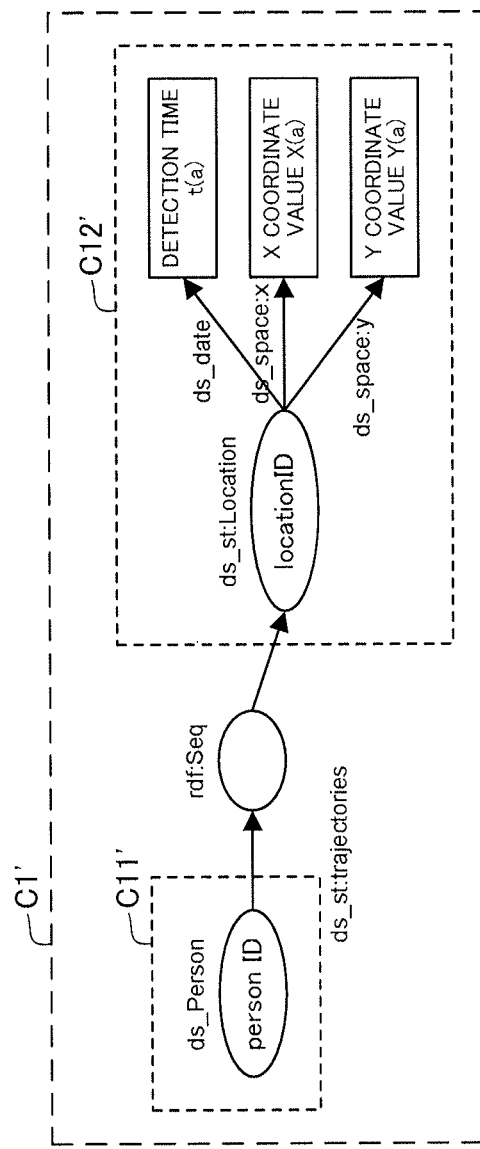
FIG. 6 is a diagram showing an example of a recognition result acquired from a recognition engine by the intermediate-layer device in the first exemplary embodiment of the present invention.

A class structure, which is a data format of recognition result information corresponding to the person recognition engine 21 and which is recognition result definition information defined by, for example, a graph structure or a tree structure, is stored into the class structure holding unit 14 (a definition information storing means) and the class ID holding unit 16 from the class structure registering unit 15, and defined. To be specific, as shown in FIG. 2, a class structure C1 corresponding to the person recognition engine 21 is defined by a graph structure such that location information C12 represented by coordinates (an X coordinate value, a Y coordinate value) of a position where an image (a frame) with a specific person detected has been captured and also represented by a date and time (detection time) when the image has been captured is placed below person identification information (a person ID) C11 identifying the detected specific person. Thus, the instance/class correspondence judging unit 12 applies values included in recognition result information actually acquired from the person recognition engine 21 to the person identification information (person ID) and the position and so on (X coordinate value, Y coordinate value, detection time) of the class structure C1 corresponding to the person recognition engine 21, and holds as shown in FIG. 6.

Figure 3:
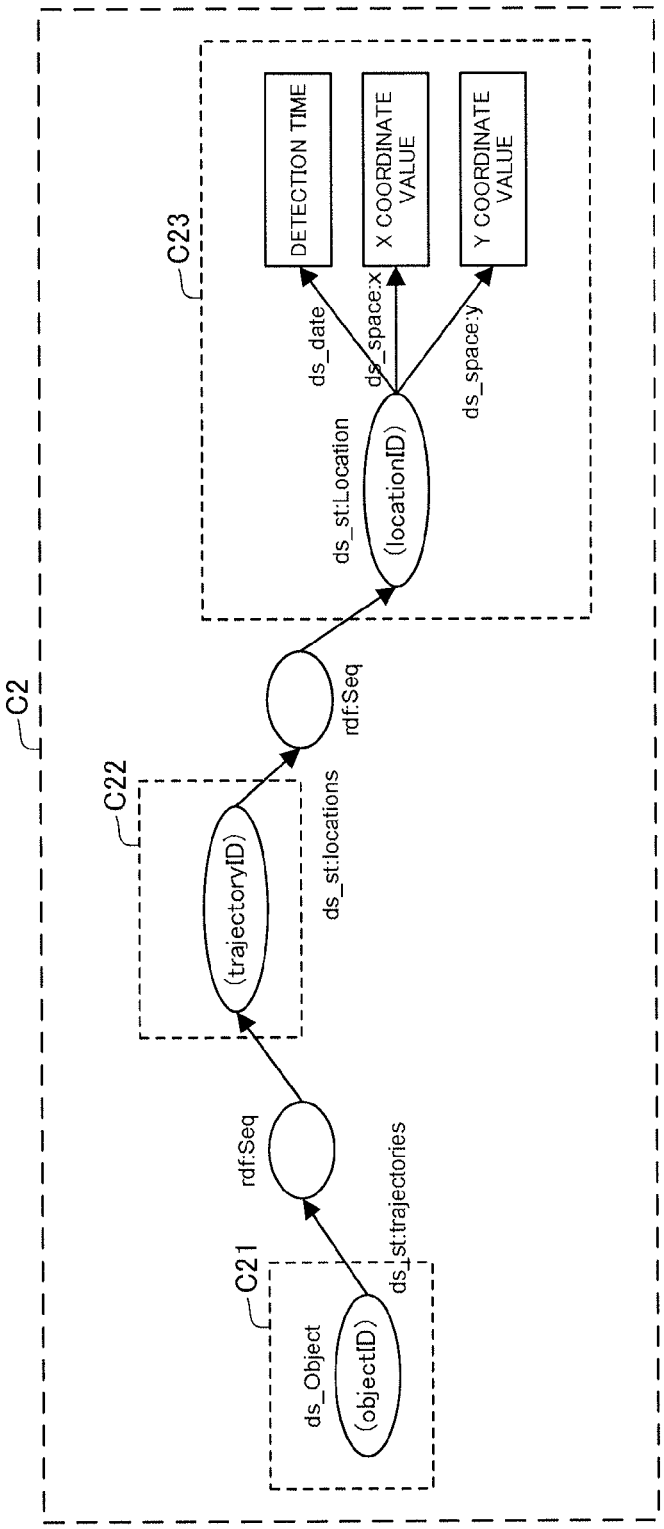
FIG. 3 is a diagram showing an example of the structure of a recognition result registered in the intermediate-layer device in the first exemplary embodiment of the present invention.
Figure 7:
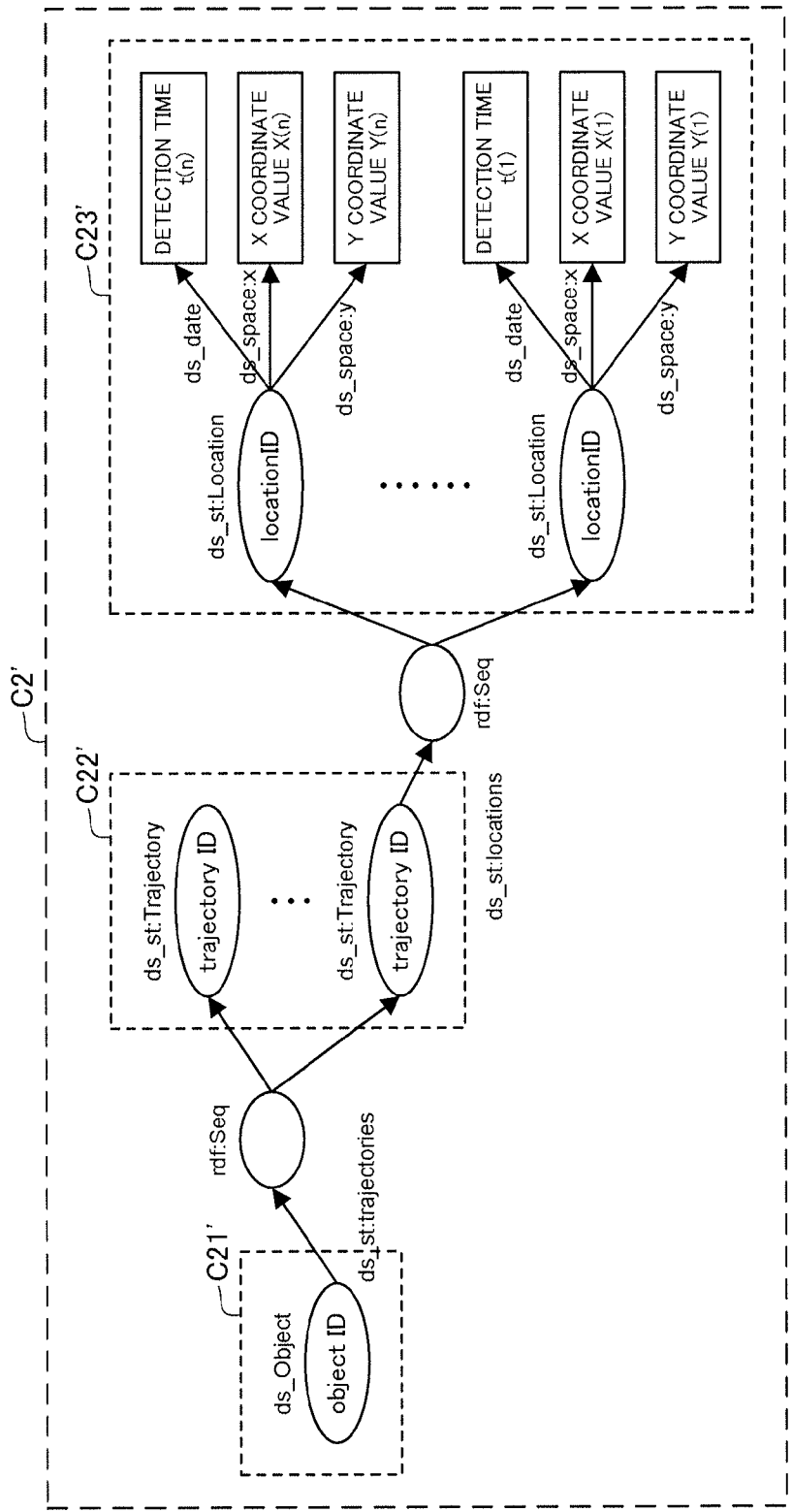
FIG. 7 is a diagram showing an example of a recognition result acquired from the recognition engine by the intermediate-layer device in the first exemplary embodiment of the present invention.

Further, as shown in FIG. 3, a class structure C2, which is a data format of recognition result information corresponding to the flow recognition engine 22 and which is recognition result definition information defined by, for example, a graph structure or a tree structure, is defined by a graph structure such that trajectory identification information (a trajectory ID) C22 identifying a whole trajectory of a detected moving object is placed below object identification information (an object ID) C21 identifying the object, and flow information C23 represented by dates and times (detection time) forming the trajectory of the detected object and coordinates (X coordinate values, Y coordinate values) of positions at these times is placed below C22. Thus, the instance/class correspondence judging unit 12 applies values included in recognition result information actually acquired from the flow recognition engine 22 to the object identification information (object ID) and the position and so on (X coordinate value, Y coordinate value, detection time) of the class structure C2 corresponding to the flow recognition engine 22, and holds as shown in FIG. 7.

The output instance holding unit 13 (an integration recognition result outputting means) included in the intermediate-layer device 10 integrates the recognition result information acquired from the person recognition engine 21 and the recognition result information acquired from the flow recognition engine 22 that are applied to the previously defined class structures C1 and C2 and held as described above, and holds as a new recognition result. To be specific, the output instance holding unit 13 integrates the recognition result information in accordance with a class structure C3. The class structure C3 is previously stored in the class structure holding unit 14 (a definition information storing means) and the class ID holding unit 16, and is integration definition information showing an integration format that is a data format representing a condition of integration of the recognition result information and a new recognition result after integration, by a graph structure or a tree structure.

Figure 4:
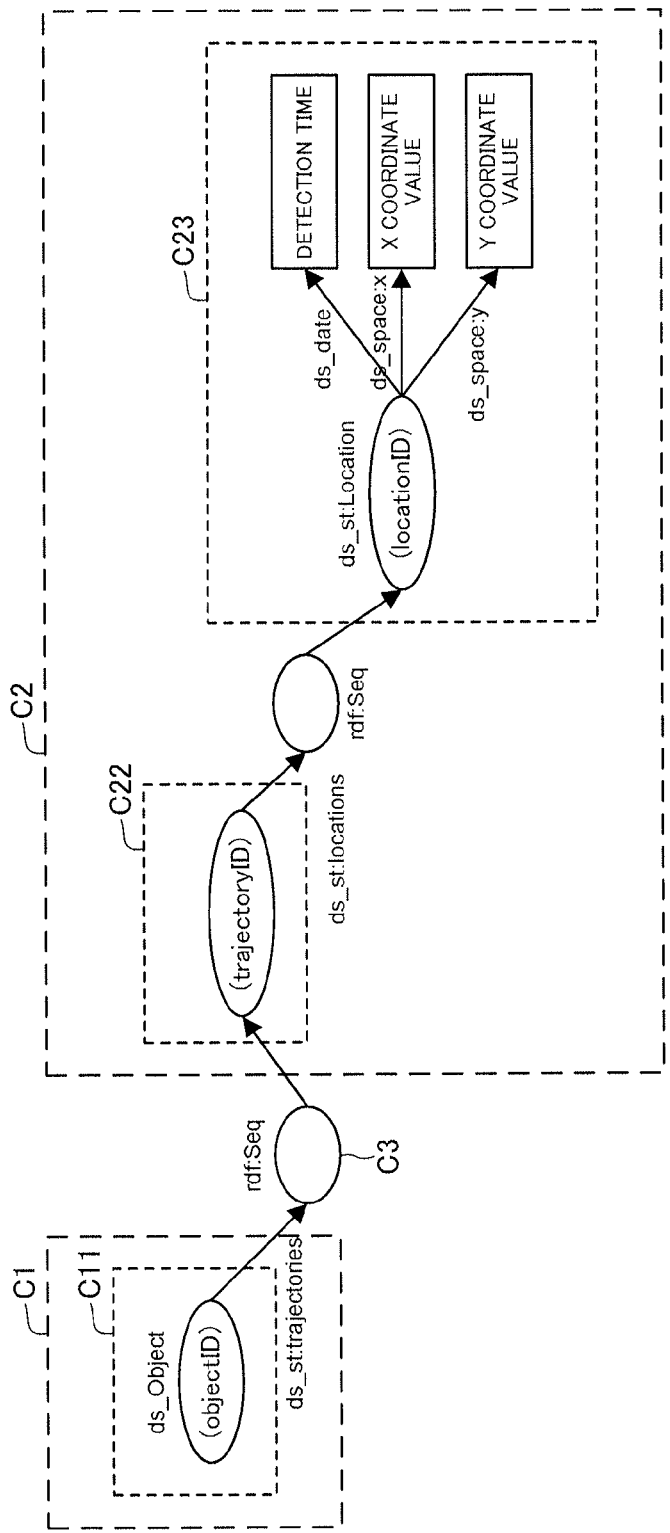
FIG. 4 is a diagram showing an example of the structure of a recognition result registered in the intermediate-layer device in the first exemplary embodiment of the present invention.

As shown in FIG. 4, a class structure representing a data format of a condition of integration of the recognition result information and a new recognition result after integration represents the structure C3 such that the trajectory identification information (trajectory ID) C22 and the flow information C23 are related and integrated with the person identification information (person ID) C11, which is part of the recognition result C1 acquired from the person recognition engine 21 and identifies a detected specific person.

Figure 9:
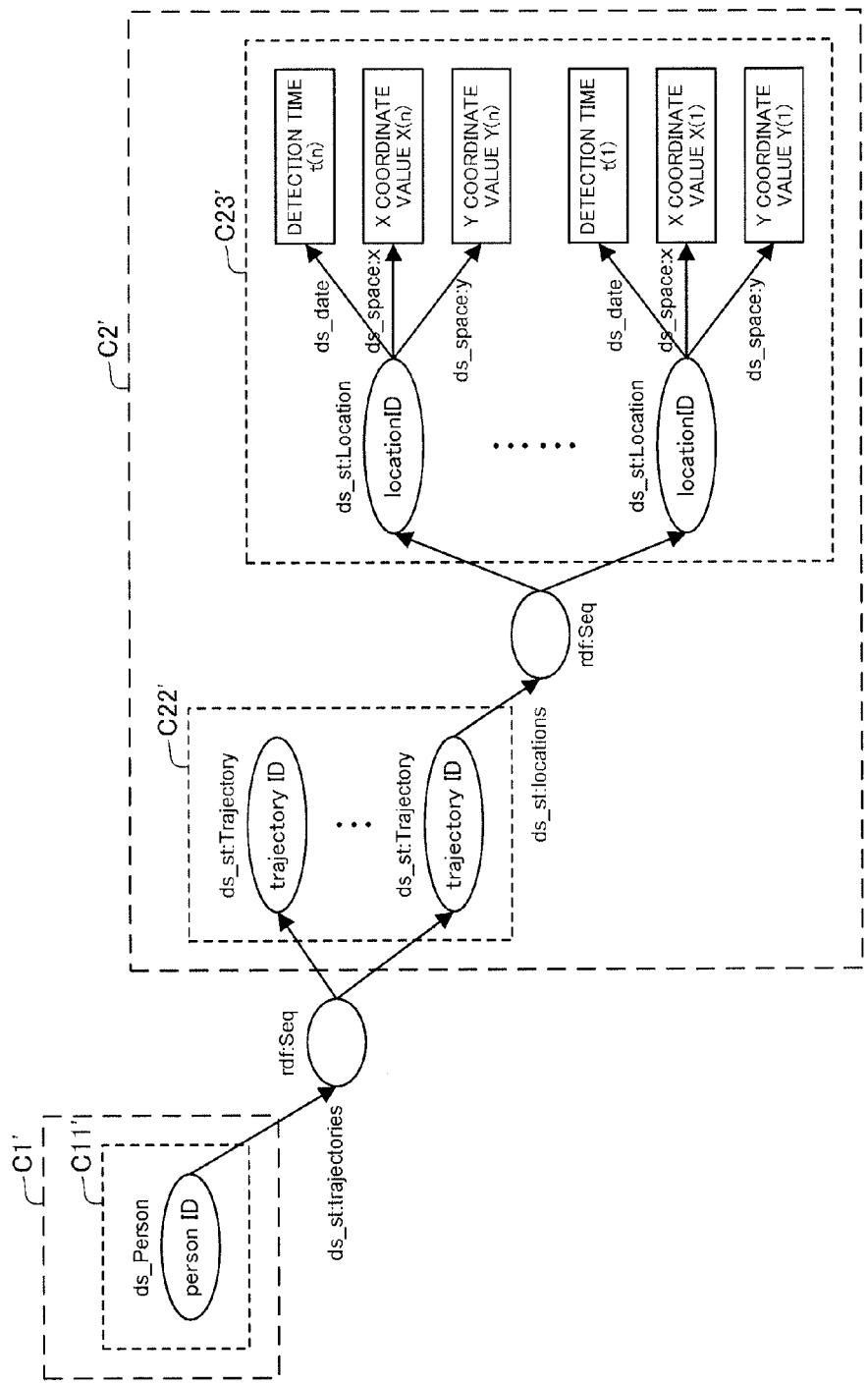
FIG. 9 is a diagram showing a state in which the intermediate-layer device has integrated recognition results acquired from the recognition engines in the first exemplary embodiment of the present invention.

In this case, a condition of integration of the recognition result information as described above is that the person identification information (person ID) C11 outputted from the person recognition engine 21 coincides with part of the object identification information (object ID) C21 outputted from the flow recognition engine 21. For judgment of this, the output instance holding unit 13 examines whether the recognition result information detected by the respective engines 21 and 22 include information judged to correspond to each other in accordance with a predetermined standard. To be specific, the output instance holding unit 13 examines whether the flow information C23 outputted by the flow recognition engine 22 includes information that coincide with the location information C12, namely, a date/time and position of detection of a specific person outputted by the object recognition engine 21. In a case that the location information C12 and part of the flow information C23 coincide with each other, the output instance holding unit 13 relates the coincident flow information C23 and the trajectory identification information C22 above C23 to the person identification information (person ID) C11 corresponding to the coincident location information C12, and holds a new recognition result as shown in FIG. 9.

However, a condition of integration of the recognition result information is not limited to that the recognition result information detected by the respective engines 21 and 22 include information that coincide with each other as described above. For example, in a case that the flow information C23 outputted by the flow recognition engine 22 includes information "close to" the location information C12, namely, the date/time and position of detection of a specific person outputted by the person recognition engine 21, the output instance holding unit 13 may judge that the flow information C23 and the location information C12 correspond to each other and integrate by relating the flow information C23 and the trajectory identification information C22 above C23 to the person identification information C11 corresponding to the location information C12. In this case, "close to" the date/time and position of detection of a specific person shall include, for example, a date/time and position within an allowance previously set for the detection date/time and position.

The data format of the recognition result information outputted by the respective recognition engines 21 and 22 and the format of integration of the recognition result information by the output instance holding unit 13 are defined by a graph structure or a tree structure in the above case shown as an example, but may be defined by another data format.

Further, the output instance holding unit 13 outputs a new recognition result generated and held as described above to the application unit 30.

[Operation]

Figure 5:
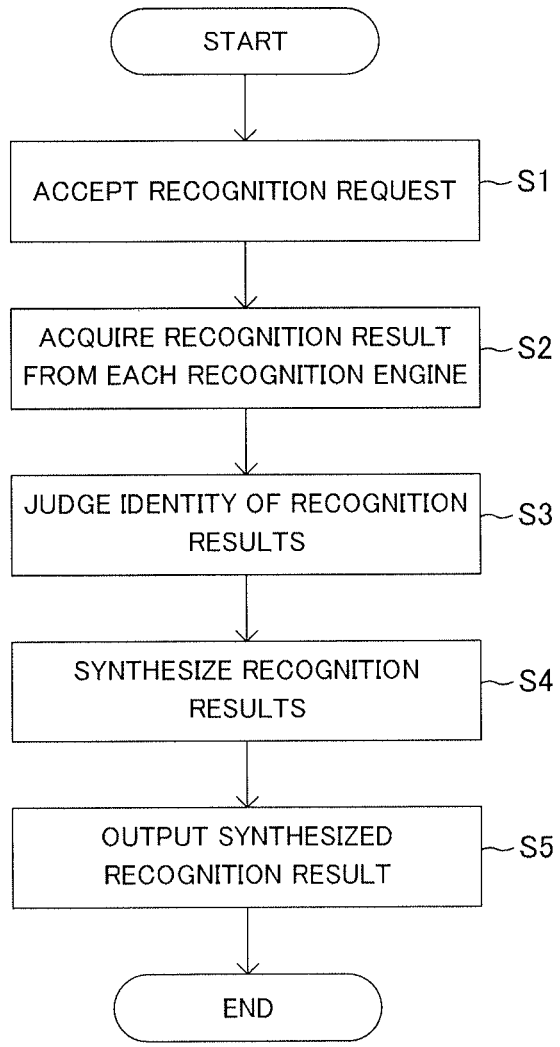
FIG. 5 is a flowchart showing the operation of the intermediate-layer device in the first exemplary embodiment of the present invention.

Next, the operation of the information processing system described above, specifically, the operation of the intermediate-layer device 10 will be described with reference to a flowchart of FIG. 5 and data transition diagrams of FIGS. 6 to 9.

First, the intermediate-layer device 10 accepts a request for a recognition result from the application unit 30 (step S1). Herein, it is assumed that the intermediate-layer device 10 accepts a request for a recognition result of the "flow of a specific person."

Subsequently, the intermediate-layer device 10 acquires recognition result information from the respective recognition engines used for outputting the recognition result requested by the application unit 30. In this exemplary embodiment, the intermediate-layer device 10 acquires recognition result information that the person recognition engine 21 and the flow recognition engine 22 have generated in recognition processes, from the respective engines (step S2). Then, the intermediate-layer device 10 holds the respective recognition result information having been acquired, in accordance with previously defined class structures. To be specific, the intermediate-layer device 10 applies the recognition result information acquired from the person recognition engine 21 to the class structure C1 corresponding to the person recognition engine shown in FIG. 2, and holds as shown in FIG. 6. Moreover, the intermediate-layer device 10 applies the recognition result information acquired from the flow recognition engine 21 to the class structure C2 corresponding to the flow recognition engine shown in FIG. 2, and holds as shown in FIG. 7.

Figure 8:
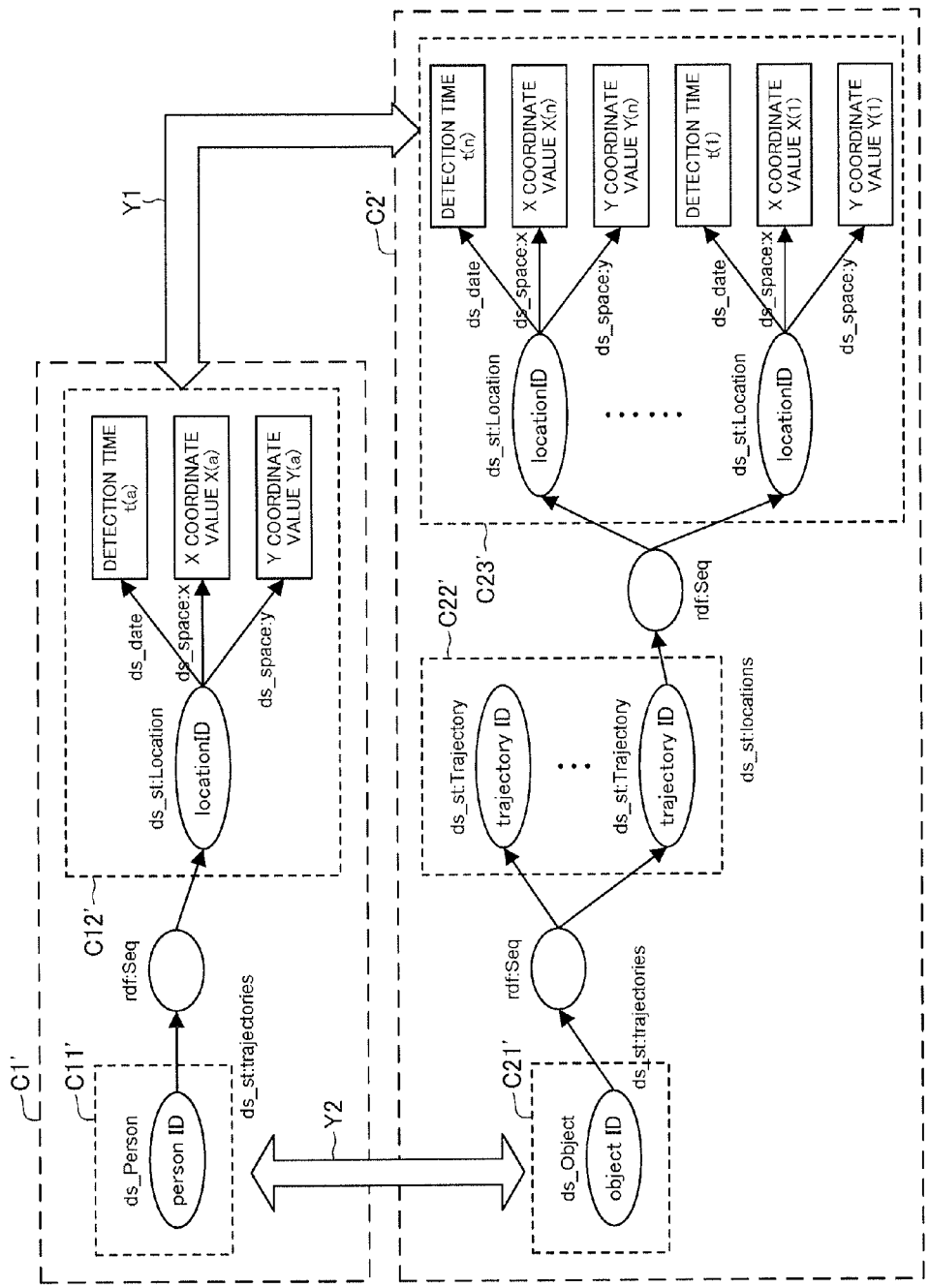
FIG. 8 is a diagram showing a state in which the intermediate-layer device is integrating recognition results acquired from recognition engines in the first exemplary embodiment of the present invention.

Subsequently, the intermediate-layer device 10 examines the identity of person identification information (person ID) C11' and object identification information (object ID) C21' included by the respective recognition result information acquired from the person recognition engine 21 and the flow recognition engine 22 applied and held in respective class structures C1' and C2' as shown in FIGS. 6 and 7 (step S3, see arrow Y2 in FIG. 8). To be specific, the intermediate-layer device 10 examines whether flow information C23' outputted from the flow recognition engine 22 includes information coincident with location information C12' outputted from the person recognition engine 21.

In a case that the flow information C23' includes information coincident with the location information C12', the intermediate-layer device 10 judges that the person identification information (person ID) C11' and the object identification information (object ID) C21' that include the coincident information are identical to each other. Then, as shown in FIG. 9, the intermediate-layer device 10 relates and integrates the person identification information (person ID) C11' and trajectory identification information C22' placed below the object identification information (object ID) C21' judged identical to C11' and the flow information C23' placed below C22', and holds as a new recognition result (step S4).

After that, the intermediate-layer device 10 outputs the new recognition result generated and held as described above to the application unit 30 (step S5).

In the above description, the recognition results acquired from the engines 21 and 22 are integrated when the location information C12' outputted from the person recognition engine 21 coincides with part of the flow information C23' outputted from the flow recognition engine 22, but a condition of integration is not limited to such a condition. For example, the recognition result information may be integrated as described above when the person identification information (person ID) C11' included in the recognition result information acquired from the person recognition engine 21 coincides with the object identification information (object ID) C21' included in the recognition result information acquired from the flow recognition engine 22. Alternatively, the recognition result information may be integrated when the flow information C23' outputted from the flow recognition engine 22 includes information "close to" the location information C12' outputted from the person recognition engine 21.

In the above description, the process is executed in the following order: accept a request for a recognition result from the application unit 30 (step S1); acquire recognition results from the respective recognition engines (step S2); and synthesize the recognition results (step S4). However, execution of the process is not limited by such a procedure. For example, the process may be executed in the following order: previously execute steps S2, S3 and S4 shown in FIG. 5, that is, previously acquire recognition results from the respective recognition engines and synthesize the recognition results, and accumulate the results of synthesis in the intermediate-layer device 10; and when accepting a request for a recognition result from the application unit 30, extract a synthesis result corresponding to the request from among the accumulated data and output to the application unit 30.

Thus, providing the intermediate-layer device 10 in this exemplary embodiment to hold recognition result information in a common data format to a plurality of recognition engines facilitates reuse of recognition results acquired from the respective recognition engines for other purposes. Therefore, it becomes easy to develop a recognition engine and an application that requests for a recognition result, and it is possible to increase the versatility of a recognition engine at low costs.

Second Exemplary Embodiment

Next, a second exemplary embodiment of the present invention will be described with reference to FIGS. 1 and 5 and FIGS. 10 to 13. FIG. 1 is a diagram for describing the configuration of an intermediate-layer device in this exemplary embodiment. FIG. 5 and FIGS. 10 to 13 are diagrams for describing the operation thereof.

[Configuration]

An information processing system in the second exemplary embodiment includes, as in the first exemplary embodiment, the plurality of recognition engines 21 to 23, the intermediate-layer device 10 connected with the recognition engines 21 to 23, and the application unit 30 implemented in the information processing terminal connected with the intermediate-layer device 10 as shown in FIG. 1.

Both the recognition engines in this exemplary embodiment are person recognition engines that identify a person from recognition target data, but recognition methods thereof are different from each other. For example, a first personal recognition engine (denoted by reference numeral 21 hereinafter) recognizes a specific person based on feature data of faces of persons previously set from moving image data. Moreover, a second person recognition engine (denoted by reference numeral 22 hereinafter) recognizes a specific person based on feature data of voices of persons previously set from speech data. Moreover, a third person recognition engine (denoted by reference numeral 23 hereinafter) recognizes a specific person based on the content of utterance (keyword) previously set from speech data. However, the recognition engines are not limited to those executing the processes and the number thereof is not limited to the above-mentioned number. For example, the person recognition engine may be an object recognition engine that identifies not only a person but also a preset object.

The respective person recognition engines 21, 22 and 23 in this exemplary embodiment output recognition result information to the intermediate-layer device 10 in a common data format that is previously registered in the intermediate-layer device 10. To be specific, each of the person recognition engines 21, 22 and 23 outputs, as recognition result information, person candidate information including information identifying one or more candidate persons based on the results of recognition by the respective recognition methods.

Figure 10:
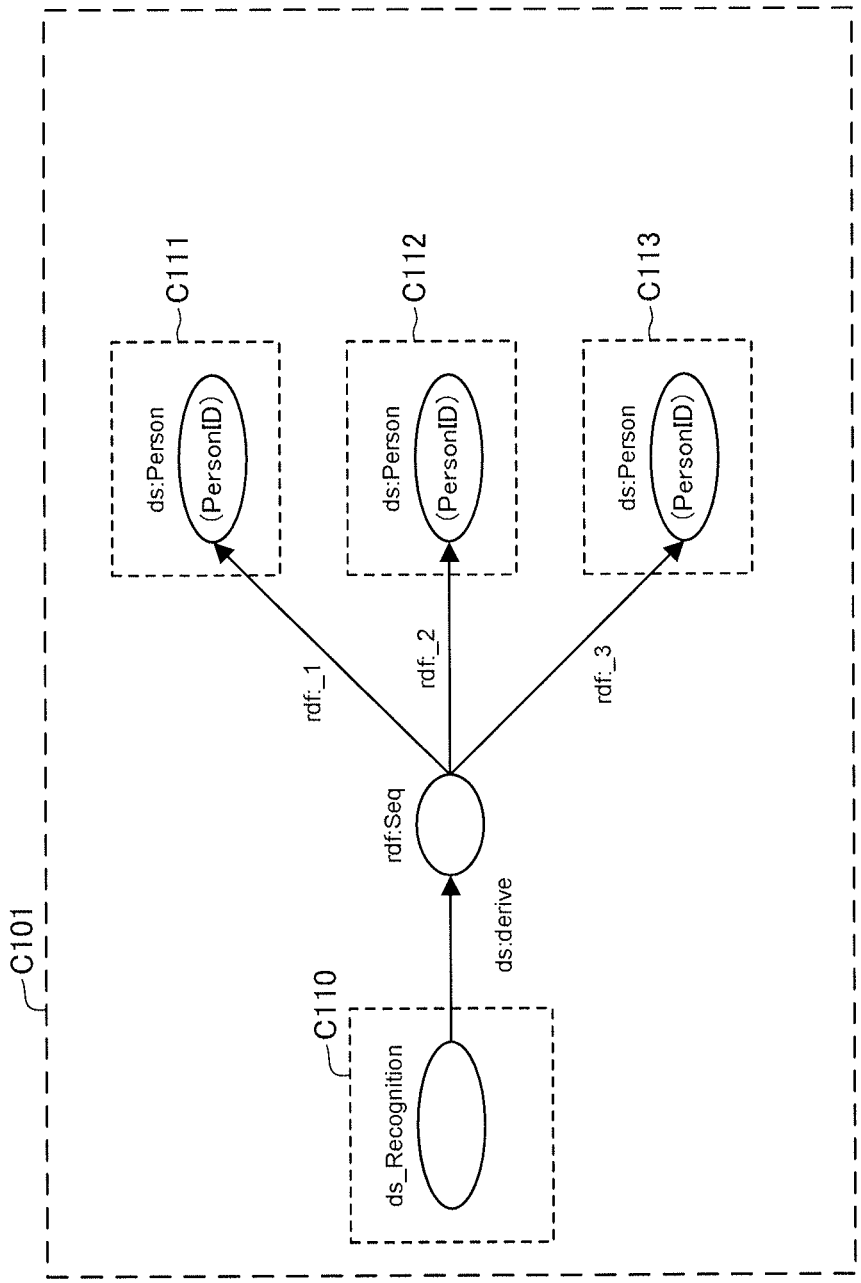
FIG. 10 is a diagram showing an example of the structure of a recognition result registered in an intermediate-layer device in the second exemplary embodiment of the present invention.

Correspondingly, the intermediate-layer device 10 stores a class structure C101, which defines a data format of the respective recognition result information corresponding to the person recognition engines 21, 22 and 23 and which is recognition result definition information of, for example, a graph structure or a tree structure, in the class structure holding unit 14 and so on as shown in FIG. 10. To be specific, the class structure C101 corresponding to the respective person recognition engines 21, 22 and 23 is defined by a graph structure in which person identification information C111, C112 and C113 identifying one or more persons of recognition candidates are placed below engine identification information C110 identifying the person recognition engine having executed a recognition process, as shown in FIG. 10. Herein, the class structure C101 is defined so that person identification information of three persons who are the most likely to become candidates as a result of the recognition process are placed and stored in order from the top. Consequently, the instance/class correspondence judging unit 12 of the intermediate-layer device 10 holds by applying the recognition result information that the recognition-engine output acquiring unit 11 has acquired from the person recognition engines 21, 22 and 23 to the class structure C101 for each of the person recognition engines 21, 22 and 23, as shown by reference numerals C101-1, C101-2 and C101-3 in FIG. 12.

Then, the output instance holding unit 13 included by the intermediate-layer device 10 integrates the recognition result information having been acquired from the respective person recognition engines 21, 22 and 23, applied to the previously defined class structure C101 and held as described above, and holds as a new recognition result. To be specific, the output instance holding unit 13 integrates the recognition result information in accordance with a class structure C102, which is previously defined in the class structure holding unit 14 and so on, and which is integration definition information defining, in a graph structure or a tree structure, an integration format that is a data format representing a condition of integration of the recognition result information and representing a new recognition result after integration.

Figure 11:
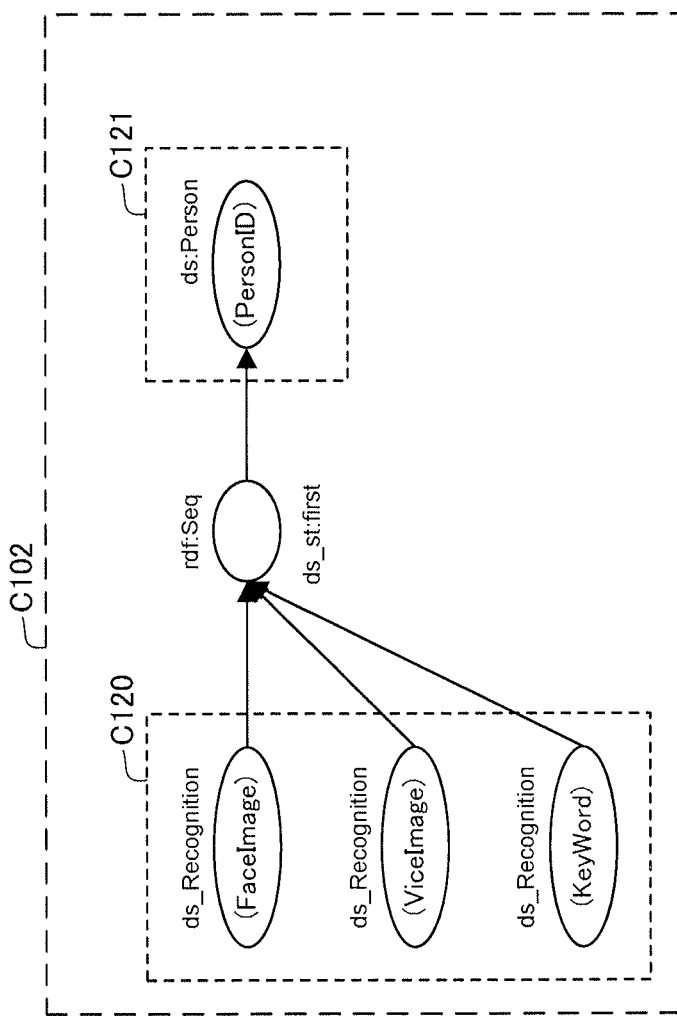
FIG. 11 is a diagram showing an example of the structure of a recognition result registered in the intermediate-layer device in the second exemplary embodiment of the present invention.

As shown in FIG. 11, a class structure representing a data format of a condition of integration of the recognition result information and a new recognition result after integration represents a structure of integration so as to identify one person identification information (person ID) C121 from among person identification information of candidate persons of the recognition result information C120 acquired from the respective person recognition engines 21, 22 and 23.

In this case, a condition of integration of the recognition result information as described above is that there exists coincident person identification information among person identification information (person ID) outputted from the different person recognition engines 21, 22 and 23. For judgment, the output instance holding unit 13 examines whether the respective recognition result information outputted by the engines 21 and 22 include person identification information judged to correspond to each other in accordance with a predetermined standard. To be specific, the output instance holding unit 13 examines whether all of the three recognition result information outputted from the three person recognition engines 21, 22 and 23 include identical person identification information, identifies the identical person identification information (person ID), and holds this person identification information as a new identification result.

However, the condition of integration of the recognition result information is not limited to that the recognition result information detected by the respective engines 21, 22 and 23 include information that is coincident with each other. For example, similarity of attribute information, which is feature value data extracted from data of persons corresponding to the respective person identification information (person IDs) having been detected is firstly judged in accordance with a predetermined standard. Then, in a case that the degree of the similarity is within a preset range in accordance with the standard, the persons of the respective person identification information are judged to be identical.

The data format of the recognition result information acquired from the respective recognition engines 21, 22 and 23 and the format of integration of the recognition result information by the output instance holding unit 13 are defined by a graph structure or a tree structure in the above case described as an example, but may be defined by another data format.

Further, the output instance holding unit 13 outputs a new recognition result generated and held as described above to the application unit 30.

[Operation]

Next, the operation of the information processing system described above, specifically, the operation of the intermediate-layer device 10 will be described with reference to the flowchart of FIG. 5 and the data transition diagrams of FIGS. 10 to 13.

First, the intermediate-layer device 10 accepts a request for a recognition result from the application unit 30 (step S1). For example, it is assumed that the intermediate-layer device 10 accepts a request for a recognition result of "identification of a person."

Subsequently, the intermediate-layer device 10 acquires recognition result information from the respective recognition engines used for outputting the recognition result requested by the application unit 30 (step S2). Then, the intermediate-layer device 10 holds the respective recognition result information having been acquired in accordance with a previously defined class structure.

Figure 12:
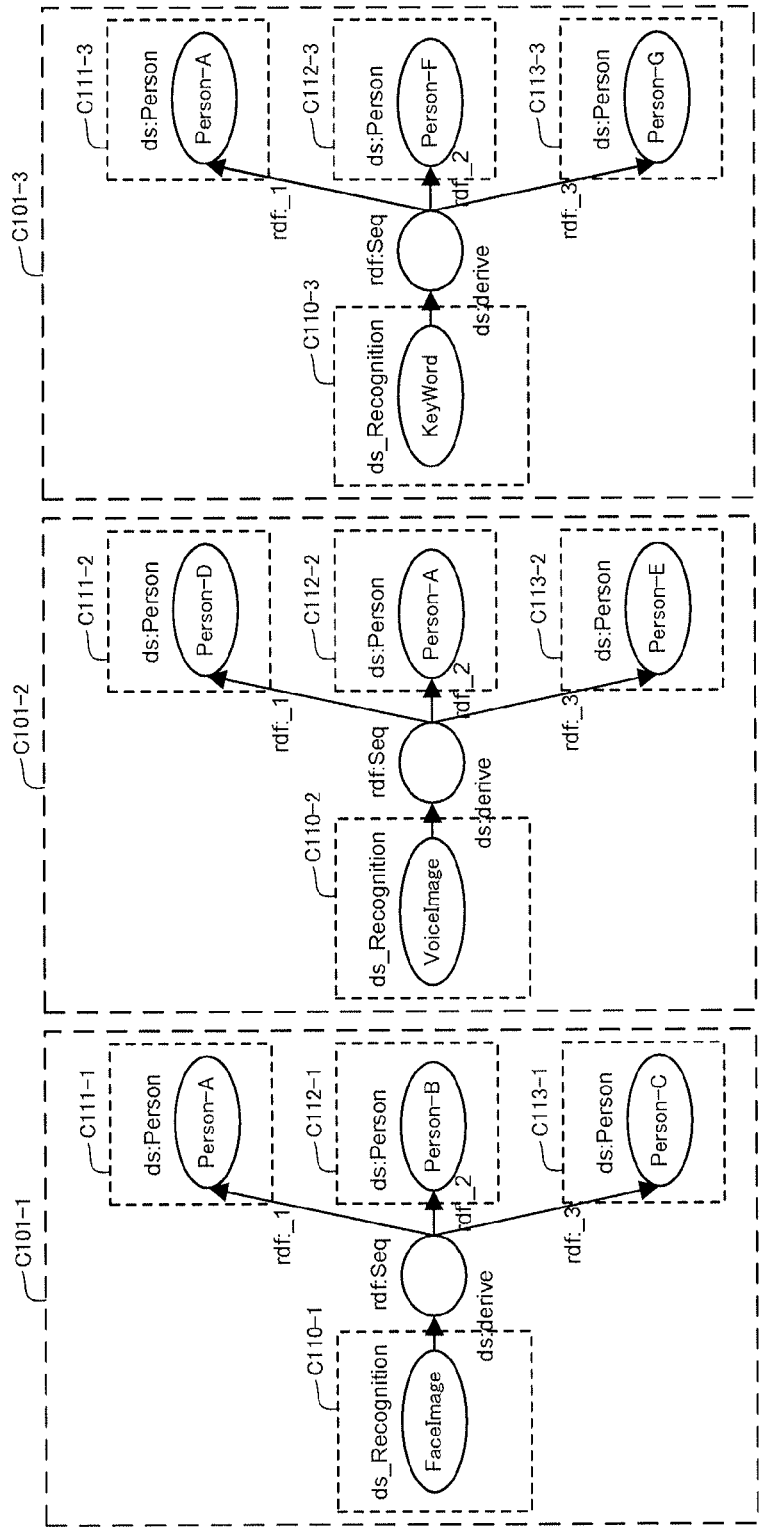
FIG. 12 is a diagram showing a state in which the intermediate-layer device is integrating recognition results acquired from recognition engines in the second exemplary embodiment of the present invention.

To be specific, in this exemplary embodiment, three person identification information as candidates acquired from the first person recognition engine 21 recognizing a person based on feature data of the face of a person from moving image data are applied to the class structure and held as shown by reference numeral C101-1 in FIG. 12. Moreover, three person identification information as candidates acquired from the second person recognition engine 22 recognizing a person based on feature data of the voice of a person from speech data are applied to the class structure and held as shown by reference numeral C101-2 in FIG. 12. Furthermore, three person identification information as candidates acquired from the third person recognition engine 23 recognizing a person based on the content of utterance (keyword) from speech data are applied to the class structure and held as shown by reference numeral C101-3 in FIG. 12.

Figure 13:
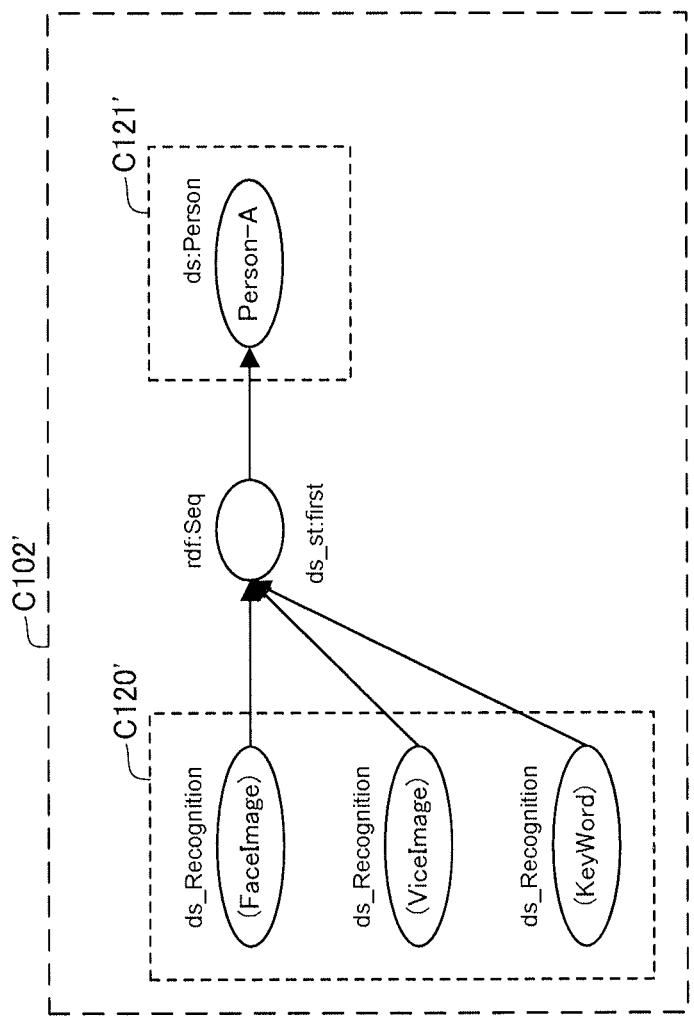
FIG. 13 is a diagram showing a state in which the intermediate-layer device has integrated recognition results acquired from the recognition engines in the second exemplary embodiment of the present invention.

Subsequently, the intermediate-layer device 10 examines person identification information corresponding to each other, herein, person identification information common to each other, among the person identification information (person IDs) C111-1 to C113-1, C111-2 to C113-2 and C111-3 to C113-3 that are candidates acquired from the respective person recognition engines 21, 22 and 23 and that are applied and held in the defined class structure as shown in FIG. 12 (step S3). In the example shown in FIG. 12, because the person identification information of "Person-A" is common as shown by reference numerals C111-1, C112-2 and C111-3 among all the recognition result information, the intermediate-layer device 10 integrates the recognition results into one person identification information C121' represented by "Person-A" as shown in FIG. 13 (step S4). Alternatively, in a case that, as a result of judgment of similarity of attribute information attached to the respective person identification information, the degree of the similarity is higher than a standard, the intermediate-layer device 10 may judge a person in respective person identification information is an identical person, and integrate recognition results.

In the above description, the process is executed in the following order: accept a request for a recognition result from the application unit 30 (step S1); acquire recognition results from the respective recognition engines (step S2); and synthesize the recognition results (step S4). However, execution of the process is not limited by such a procedure. For example, the intermediate-layer device 10 may execute the process in the following order: previously acquire recognition results from the respective recognition engines to synthesize the recognition results, and accumulate the results of synthesis into the intermediate-layer device 10; and then, upon acceptance of a request for a recognition result from the application unit 30, extract a synthesis result corresponding to the request from the accumulated data and output to the application unit 30.

After that, the intermediate-layer device 10 outputs a new recognition result generated and held as described above to the application unit 30 (step S5).

Thus, providing the intermediate-layer device 10 in this exemplary embodiment and holding recognition result information in a data format common to a plurality of recognition engines facilitates reuse of recognition results acquired from the respective recognition engines for other purposes. Therefore, it becomes easy to develop a recognition engine and an application that requests for a recognition result, and it is possible to increase the versatility of a recognition engine at low costs.

In the above description, the intermediate-layer device 10 integrates recognition results so that a person commonly included in all the recognition results is identified from among candidate persons outputted from the person recognition engines 21, 22 and 23, but the condition of integration is not limited thereto. The intermediate-layer device 10 may integrate recognition results by another method, for example, by integrating recognition results so as to identify a person included in half or more of the recognition engines. Moreover, in the example described above, each of the person recognition engines 21, 22 and 23 outputs three candidate persons as a recognition result, but may output only one candidate person as a recognition result, or may output another number of candidate persons as a recognition result.

<Supplementary Notes>

Figure 14:
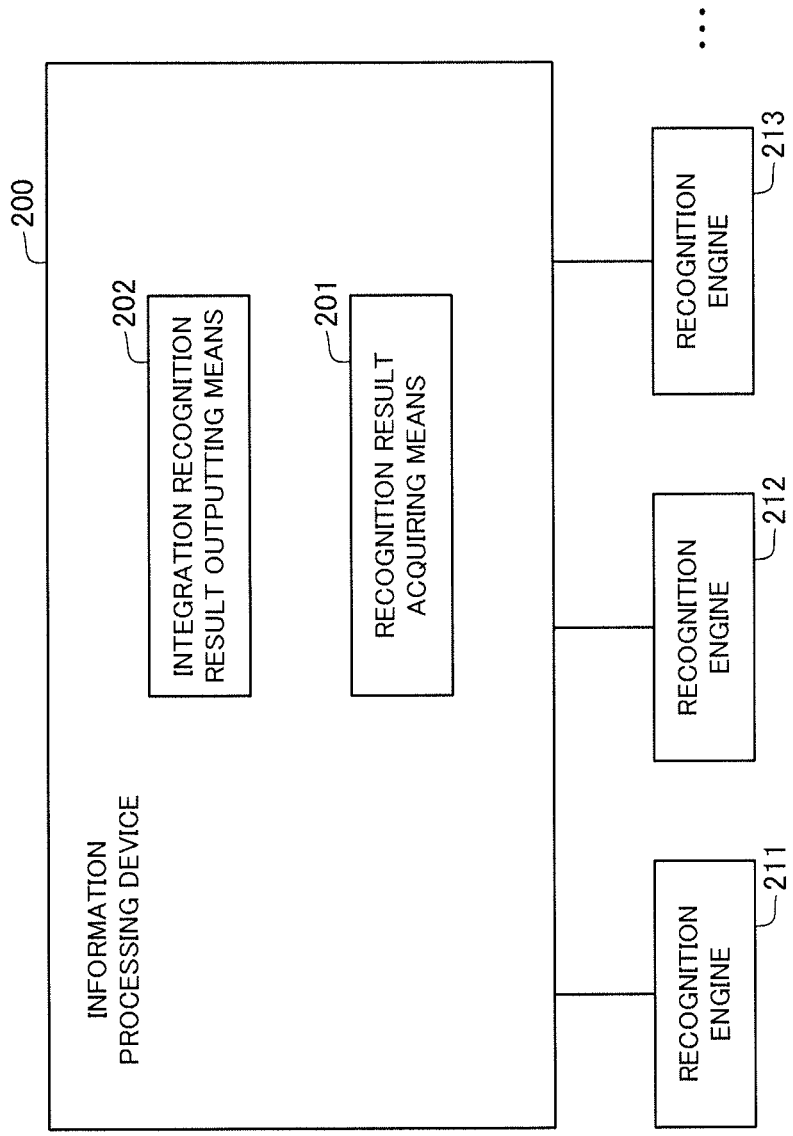
FIG. 14 is a block diagram showing the configuration of an information processing device in Supplementary Note 1 of the present invention.

The whole or part of the exemplary embodiments disclosed above can be described as the following supplementary notes. Below, the outline of the configuration of the information processing device according to the present invention will be described with reference to FIG. 14. However, the present invention is not limited to the following configurations.

(Supplementary Note 1)

An information processing device 200 comprising:

a recognition result acquiring means 201 for acquiring respective recognition result information outputted by a plurality of recognition engines 211, 212 and 213 executing different recognition processes on recognition target data; and an integration recognition result outputting means 202 for outputting a new recognition result obtained by integrating the respective recognition result information acquired from the plurality of recognition engines, wherein:

the recognition result acquiring means 201 is configured to acquire the respective recognition result information in a data format common to the plurality of recognition engines; and the integration recognition result outputting means 202 is configured to integrate the respective recognition result information based on the respective recognition result information, and output as the new recognition result.

(Supplementary Note 2)

The information processing device according to Supplementary Note 1, wherein the integration recognition result outputting means is configured to, when the respective recognition result information include information that correspond to each other in accordance with a predetermined standard, integrate the respective recognition result information and output as the new recognition result.

(Supplementary Note 3)

The information processing device according to Supplementary Note 1 or 2, comprising a definition information storing means for storing: recognition result definition information that defines a data format of the recognition result information acquired by the recognition result acquiring means from each of the plurality of recognition engines; and integration definition information that defines an integration format in which the integration recognition result outputting means integrates the respective recognition result information, wherein:

the recognition result acquiring means is configured to acquire the respective recognition result information in the data format defined by the recognition result definition information; and the integration recognition result outputting means is configured to integrate the respective recognition result information in the integration format defined by the integration definition information, and output the new recognition result.

(Supplementary Note 4)

The information processing device according to any of Supplementary Notes 1 to 3, wherein the recognition result information acquired by the recognition result acquiring means from each of the plurality of recognition engines is in a graph-structured or tree-structured data format.

(Supplementary Note 5)

The information processing device according to Supplementary Note 2, wherein:

the recognition result acquiring means is configured to acquire the recognition result information from an object recognition engine that recognizes an object from the recognition target data and a flow recognition engine that recognizes a flow representing a trajectory of a predetermined object from the recognition target data, respectively; and the integration recognition result outputting means is configured to integrate by relating flow information of a predetermined object with object information and output as the new recognition result, the flow information being the recognition result information acquired from the flow recognition engine, and the object information being the recognition result information acquired from the object recognition engine.

(Supplementary Note 6)

The information processing device according to Supplementary Note 5, wherein:

the recognition result acquiring means is configured to: acquire the recognition result information including location information representing a position of an object recognized from the recognition target data by the object recognition engine and also representing a date and time when the object is recognized, from the object recognition engine; and also acquire flow information of a predetermined object recognized from the recognition target data by the flow recognition engine, from the flow recognition engine; and the integration recognition result acquiring means is configured to, when the flow information acquired from the flow recognition engine includes information that corresponds to the location information acquired from the object recognition engine in accordance with a predetermined standard, integrate by relating the flow information that is the recognition result acquired from the flow recognition engine with object information identified by the recognition result information that is acquired from the object recognition engine and that includes the information corresponding to the location information, and output as the new recognition result.

(Supplementary Note 7)

The information processing device according to Supplementary Note 2, wherein:

the recognition result acquiring means is configured to acquire the recognition result information from a plurality of object recognition engines recognizing an object from the recognition target data in different recognition processes, respectively; and the integration recognition result outputting means is configured to integrate by identifying one object information based on respective object information that are the respective recognition result information acquired from the plurality of object recognition engines, and output the new recognition result.

(Supplementary Note 8)

The information processing device according to Supplementary Note 7, wherein:

the recognition result acquiring means is configured to acquire the recognition result information including object candidate information representing a candidate of an object recognized from the recognition target data by each of the plurality of object recognition engines, from each of the plurality of object recognition engines; and the integration recognition result acquiring means is configured to identify object information that corresponds to each other in accordance with a predetermined standard in the respective object candidate information acquired from the plurality of object recognition engines, and output as the new recognition result.

(Supplementary Note 9)

A computer program comprising instructions for causing an information processing device to realize:

a recognition result acquiring means for acquiring respective recognition result information outputted by a plurality of recognition engines executing different recognition processes on recognition target data; and an integration recognition result outputting means for outputting a new recognition result obtained by integrating the respective recognition result information acquired from the plurality of recognition engines, the computer program also comprising instructions for:

causing the recognition result acquiring means to acquire the respective recognition result information in a data format common to the plurality of recognition engines, from the plurality of recognition engines; and causing the integration recognition result outputting means to integrate the respective recognition result information based on the respective recognition result information and output as the new recognition result.

(Supplementary Note 10)

The computer program according to Supplementary Note 9, comprising instructions for causing the integration recognition result outputting means to, when the respective recognition result information include information that correspond to each other in accordance with a predetermined standard, integrate the respective recognition result information and output as the new recognition result.

(Supplementary Note 11)

An information processing method comprising:

acquiring respective recognition result information outputted by a plurality of recognition engines executing different recognition processes on recognition target data, the respective recognition result information being in a data format common to the plurality of recognition engines; and integrating the respective recognition result information based on the respective recognition result information acquired from the plurality of recognition engines, and outputting as a new recognition result.

(Supplementary Note 12)

The information processing method according to Supplementary Note 11, comprising:

integrating the respective recognition result information and outputting as the new recognition result, when the respective recognition result information include information corresponding to each other in accordance with a predetermined standard.

(Supplementary Note 13)

An information processing device comprising:

a recognition result acquiring means for acquiring respective recognition result information outputted by a plurality of recognition engines executing different recognition processes on recognition target data; and an integration recognition result outputting means for outputting a new recognition result obtained by integrating the respective recognition result information acquired from the plurality of recognition engines, wherein:

the recognition result acquiring means is configured to: acquire the recognition result information including location information that represents a position of an object recognized from the recognition target data by an object recognition engine recognizing an object from the recognition target data and also represents a date and time when the object is recognized, the recognition result information being in a data format common to the plurality of recognition engines, from the object recognition engine; and also acquire the recognition result information including flow information of a predetermined object recognized from the recognition target data by a flow recognition engine recognizing a flow representing a trajectory of a predetermined object from the recognition target data, the recognition result information being in a data format common to the plurality of recognition engines, from the flow recognition engine; and the integration recognition result acquiring means is configured to, when the flow information acquired from the flow recognition engine includes information that corresponds to the location information acquired from the object recognition engine in accordance with a predetermined standard, integrate by relating the flow information that is the recognition result acquired from the flow recognition engine with object information identified by the recognition result information that is acquired from the object recognition engine and that includes the information corresponding to the location information, and output as the new recognition result.

(Supplementary Note 14)

An information processing device comprising:

a recognition result acquiring means for acquiring respective recognition result information outputted by a plurality of recognition engines executing different recognition processes on recognition target data; and an integration recognition result outputting means for outputting a new recognition result obtained by integrating the respective recognition result information acquired from the plurality of recognition engines, wherein:

the recognition result acquiring means is configured to acquire the recognition result information including object candidate information representing a candidate of an object recognized from the recognition target data by each of a plurality of object recognition engines recognizing an object by different recognition processes from the recognition target data, the recognition result information being in a data format common to the plurality of recognition engines, from each of the plurality of object recognition engines; and the integration recognition result outputting means is configured to integrate by identifying one object information that corresponds to each other in accordance with a predetermined standard in the respective object candidate information acquired from the plurality of object recognition engines, and output as the new recognition result.

In each of the exemplary embodiments, the computer program is stored in the storage device or recorded in a computer-readable recording medium. For example, the recording medium is a portable medium such as a flexible disk, an optical disk, a magneto-optical disk and a semiconductor memory.

The present invention has been described above with reference to the exemplary embodiments, but the present invention is not limited to the exemplary embodiments described above. The configurations and details of the present invention can be modified in various manners that can be understood by those skilled in the art within the scope of the present invention.

The present invention is based upon and claims the benefit of priority from Japanese patent application No. 2011-031613, filed on Feb. 17, 2011, the disclosure of which is incorporated herein in its entirety by reference.

DESCRIPTION OF REFERENCE NUMERALS 10 intermediate-layer device
11 recognition-engine output acquiring unit
12 instance/class correspondence judging unit
13 output instance holding unit
14 class structure holding unit
15 class structure registering unit
16 class ID holding unit
21, 22, 23 recognition engine
30 application unit
200 information processing device
201 recognition result acquiring unit
202 integration recognition result outputting means
211, 212, 213 recognition engine

The invention claimed is:

1. An information processing device including a processor comprising:
  a recognition result acquiring unit implemented by the processor, for acquiring respective recognition result information outputted by a plurality of recognition engines executing different recognition processes on recognition target data; and
  an integration recognition result outputting unit implemented by the processor, for outputting a new recognition result obtained by integrating the respective recognition result information acquired from the plurality of recognition engines, wherein:
  the recognition result acquiring unit is configured to acquire the respective recognition result information in a graph-structured or tree-structured data format being previously defined, from the plurality of recognition engines; and
  the integration recognition result outputting unit is configured to, when the respective recognition result information include information corresponding to each other in accordance with a predetermined standard, integrate each part of the respective recognition result information so as to be related to each other, and output in the graph structured or tree-structured data format as the new recognition result, and further,
  the recognition result acquiring unit is configured to acquire the recognition result information from an object recognition engine that recognizes an object from the recognition target data and a flow recognition engine that recognizes a flow representing a trajectory of a predetermined object from the recognition target data respectively; and
  the integration recognition result outputting unit is configured to, based on the recognition result information acquired from the object recognition engine and the recognition result information acquired from the flow recognition engine, examine an identity of a person identification information and an object identification information, the person identification information being included in the recognition result information acquired from the object recognition engine and the object identification information being included in the recognition result information acquired from the flow recognition engine, in a case that both the recognition result information are coincident with each other integrate by relating flow information of a predetermined object with object information and output as the new recognition result, the flow information being the recognition result information acquired from the flow recognition engine, and the object information being the recognition result information acquired from the object recognition engine.

2. The information processing device according to claim 1, comprising a definition information storing unit for storing: recognition result definition information that defines a data format of the recognition result information acquired by the recognition result acquiring unit from each of the plurality of recognition engines; and integration definition information that defines an integration format in which the integration recognition result outputting unit integrates the respective recognition result information, wherein:
  the recognition result acquiring unit is configured to acquire the respective recognition result information in the data format defined by the recognition result definition information; and
  the integration recognition result outputting unit is configured to integrate the respective recognition result information in the integration format defined by the integration definition information, and output the new recognition result.

3. The information processing device according to claim 1, wherein the recognition result information acquired by the recognition result acquiring unit from each of the plurality of recognition engines is in a graph-structured or tree-structured data format.

4. The information processing device according to claim 1, wherein:
  the recognition result acquiring unit is configured to: acquire the recognition result information including location information representing a position of an object recognized from the recognition target data by the object recognition engine and also representing a date and time when the object is recognized, from the object recognition engine; and also acquire flow information of a predetermined object recognized from the recognition target data by the flow recognition engine, from the flow recognition engine; and the integration recognition result acquiring unit is configured to, when the flow information acquired from the flow recognition engine includes information that corresponds to the location information acquired from the object recognition engine in accordance with a predetermined standard, integrate by relating the flow information that is the recognition result acquired from the flow recognition engine with object information identified by the recognition result information that is acquired from the object recognition engine and that includes the information corresponding to the location information, and output as the new recognition result.

5. A non-transitory computer-readable medium storing a computer program comprising instructions for causing an information processing device to realize:

a recognition result acquiring unit for acquiring respective recognition result information outputted by a plurality of recognition engines executing different recognition processes on recognition target data; and an integration recognition result outputting unit for outputting a new recognition result obtained by integrating the respective recognition result information acquired from the plurality of recognition engines, the computer program also comprising instructions for:

causing the recognition result acquiring unit to acquire the respective recognition result information in a graph-structure or tree-structured data format being previously defined, from the plurality of recognition engines; and causing the integration recognition result outputting unit to, when the respective recognition result information include information corresponding to each other in accordance with a predetermined standard, integrate each part of the respective recognition result information so as to be related to each other and output in the graph-structured or tree-structured data format as the new recognition result, and further, acquiring the recognition result information from an object recognition engine that recognizes an object from the recognition target data and a flow recognition engine that recognizes a flow representing a trajectory of a predetermined object from the recognition target data, respectively; and causing the recognition result outputting unit to, based on the recognition result information acquired from the object recognition engine and the recognition result information acquired from the flow recognition engine, examine an identity of a person identification information and an object identification information, the person identification information being included in the recognition result information acquired from the object recognition engine and the object identification information being included in the recognition result information acquired from the flow recognition engine, in a case that both the recognition result information are coincident with each other, integrate by relating flow information of a predetermined object with object information and output as the new recognition result, the flow information being the recognition result information acquired from the flow recognition engine and the object information being the recognition result information acquired from the object recognition engine.

6. The non-transitory computer-readable storing medium storing the computer program according to claim 5, comprising instructions for causing the integration recognition result outputting unit to, when the respective recognition result information include information that correspond to each other in accordance with a predetermined standard, integrate the respective recognition result information and output as the new recognition result.

7. An information processing method comprising:

acquiring respective recognition result information outputted by a plurality of recognition engines executing different recognition processes on recognition target data, the respective recognition result information being in a graph-structured or tree-structured data format being previously defined; and when the respective recognition result information include information corresponding to each other in accordance with a predetermined standard, integrating each part of the respective recognition result information so as to be related to each other acquired from the plurality of recognition engines, and outputting in the graph-structured or tree-structured data format as a new recognition result, and further, acquiring the recognition result information from an object recognition engine that recognizes an object from the recognition target data and a flow recognition engine that recognizes a flow representing a trajectory of a predetermined object from the recognition target data, respectively; and an integration recognition result outputting unit to, based on the recognition result information acquired from the object recognition engine and the recognition result information acquired from the flow recognition engine, examine an identity of a person identification information and an object identification information, the person identification information being included in the recognition result info ion acquired from the object recognition engine and the object identification information being included in the recognition result information acquired from the flow recognition engine, in a case that both the recognition result information are coincident with each other, integrate by relating flow information of a predetermined object with object information and output as the new recognition result, the flow information being the recognition result information acquired from the flow recognition engine, and the object information being the recognition result information acquired from the object recognition engine.

8. The information processing method according to claim 7, comprising:

integrating the respective recognition result information and outputting as the new recognition result, when the respective recognition result information include information that correspond to each other in accordance with a predetermined standard.

9. The non-transitory computer-readable storing medium storing the computer program according to claim 6, comprising instructions for:

causing the recognition result acquiring unit to acquire the recognition result information from an object recognition engine that recognizes an object from the recognition target data and a flow recognition engine that recognizes a flow representing a trajectory of a predetermined object from the recognition target data, respectively; and causing the integration recognition result outputting unit to integrate by relating flow information of a predetermined object with object information and output as the new recognition result, the flow information being the recognition result information acquired from the flow recognition engine, and the object information being the recognition result information acquired from the object recognition engine.

10. The information processing method according to claim 8, comprising:
acquiring the recognition result information from an object recognition engine that recognizes an object from the recognition target data and a flow recognition engine that recognizes a flow representing a trajectory of a predetermined object from the recognition target data, respectively; and
integrating by relating flow information of a predetermined object with object information and output as the new recognition result, the flow information being the recognition result information acquired from the flow recognition engine, and the object information being the recognition result information acquired from the object recognition engine.

* * * * *